April 1, 1958  L. ODORAN  2,828,868
STABILIZER FOR VEHICLE

Filed May 18, 1955  2 Sheets—Sheet 1

INVENTOR.
Lawrence Odoran
BY
Hyde, Meyer, Baldwin & Doran
ATTORNEYS

April 1, 1958  L. ODORAN  2,828,868
STABILIZER FOR VEHICLE

Filed May 18, 1955  2 Sheets-Sheet 2

INVENTOR.
Lawrence Odoran
BY
Hyde, Meyer, Baldwin & Doran
ATTORNEYS

United States Patent Office 2,828,868
Patented Apr. 1, 1958

2,828,868
STABILIZER FOR VEHICLE
Lawrence Odoran, Cleveland, Ohio
Application May 18, 1955, Serial No. 509,274
2 Claims. (Cl. 212—145)

The invention relates to novel and improved stabilizing means for mobile cranes of a type which can be transported and used while mounted on an automobile truck or trailer. It will be evident as the description proceeds that I refer to the type of apparatus extensively used in excavation or construction work, or for lifting and moving heavy loads of any character where the crane or boom is required to make a wide swing while carrying a relatively heavy load.

As is well known to those experienced in working with this type of apparatus, when the loaded boom is swung laterally it not only imposes a heavy strain on the springs, axles, wheels, etc., on the loaded side, but it also involves the danger of tipping over the whole vehicle.

An object of the present invention is to provide novel and improved stabilizing means for assuming the load which would normally be applied to the springs and wheels on the loaded side.

Another object of the invention is to provide stabilizing means of the character defined in the last preceding paragraph which can be extended a material distance to each side of the vehicle, thereby widening the base and preventing tipping of the vehicle when the crane swings with a heavy load.

Another object of the invention is to provide stabilizing means of the type defined in the last two preceding paragraphs which can be moved to working position much faster than stabilizers previously available.

Another object of the invention is to provide stabilizing means which is ready for use at a moment's notice, without troublesome adjustments, so that the work can proceed immediately.

Another object of the invention is to provide stabilizing means of the character herein disclosed which can be left in working position even when the vehicle is being moved to a new working location.

Another object of the invention is to provide stabilizing means of the character herein described which can be fabricated easily and cheaply from readily available structural materials.

Other objects and advantages will be apparent from a study of the following description in conjunction with the accompanying drawings, in which.

Figure 1:
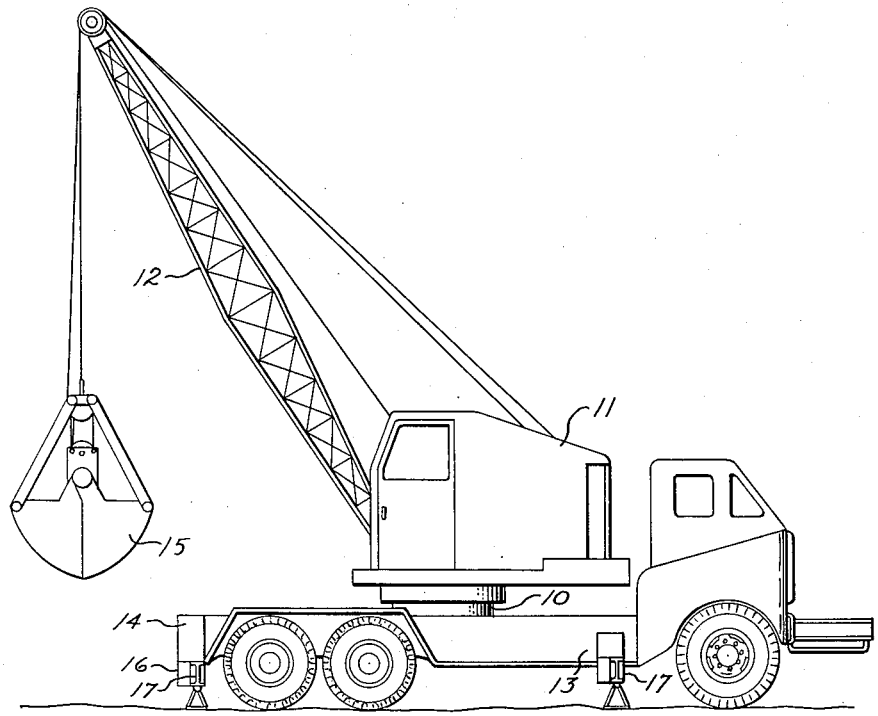
Fig. 1 is a side elevational view of a mobile crane mounted on a truck provided with my novel stabilizers.
Figure 2:
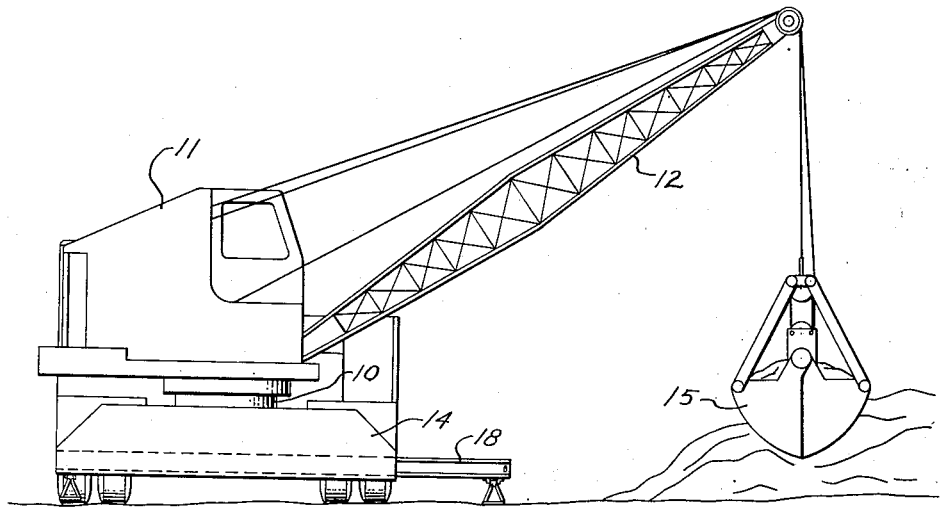
Fig. 2 is an end elevational view of the vehicle shown in Fig. 1, with the loaded boom extended laterally, and the stabilizer in the usual working position.

Referring now first to Figs. 1 and 2, I show a mobile crane having the customary base 10 upon which the operator's cab 11 and boom 12 are rotatable as a unit. The means for rotating the crane assembly, and raising and lowering the boom are conventional and need not be shown here. The base 10 is rigidly carried on the vehicle frame which includes the side frame members 13 and the cross member 14 at the rear. In the illustrations the boom 12 carries a clam-shell bucket 15 which is merely representative of any type of load which the boom may be required to lift.

The vehicle has a pair of outrigger housings 16 and 17, one behind the rear wheels immediately beneath the frame and the other between the front and rear wheels. As shown they are about evenly spaced, one each side of the base 10. Since their construction is similar only one will be described.

The outrigger housing is a metal tube of rectangular cross section (Figs. 1 and 4) which can be fabricated in any suitable way from structural sections or plate, and this tube is welded or bolted to frame 13.

Two outrigger arms 18 and 19 are carried side by side in housing 17, and they are slidable in opposite directions so that one can be extended outwardly from each side of the vehicle. Referring for example arm 18, which in the present instance is a familiar I beam, can be slid outwardly towards the observer, but arm 19 is blocked by a closure plate 20 covering one-half of the end opening of the housing 17, so that it can slide only away from the observer towards the other side of the truck. Since the housing is normally substantially horizontal the arm 18, though of heavy construction, can readily be pulled out by the operator, although some lubricating grease may be used on the inner bottom surface of the housing if it seems desirable. An elongated hole 18a may be burned in the end of arm 18 to provide a hand hold for pulling out or pushing in the arm. Any suitable stop can be provided to prevent pulling the arm completely out of the housing.

Figure 4:
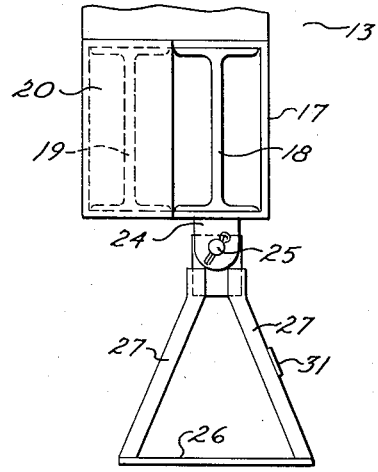
Fig. 4 is a side elevational view of the stabilizer pivotally carried on an I beam.
Figure 5:
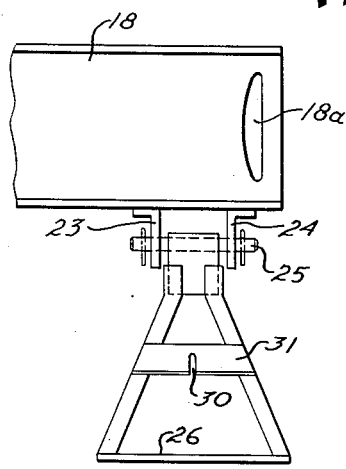
Fig. 5 is a side elevational view from the right of Fig. 4.

Referring now to Figs. 4 and 5, the bottom flange of the I beam has a pair of spaced lugs 23 and 24 which have aligned apertures to receive a pivot pin 25 which carries the stabilizer base or foot.

Figure 7:
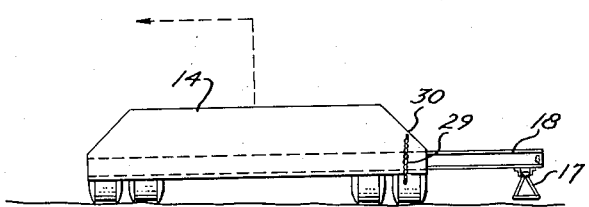
Fig. 7 is a view indicating tipping of the vehicle from the position shown in Fig. 1, with the load on the stabilizer, to the position shown here with the load applied in the direction shown by the arrow.

While this stabilizer base may be built up to any desired shape, the embodiment shown has a base plate 26 and four legs 27 which may conveniently be formed from angle-iron members. They are inclined inwardly in pyramidal form and at their top ends they are bent to receive an apex block 28 which is also bored out to receive pin 25. The foot is assembled on the stabilizer arm 18 as shown in Fig. 4. In temporarily idle position the arm may be pushed in to about the position shown on the left side in Fig. 2. When the vehicle is travelling any distance to or from a job the foot may be swung upwardly and the loose end of a chain 29 (Fig. 7) is slipped into the slot 30 of a cross piece 31 so that the next transverse chain link catches and holds the foot in upswung position.

Figure 6:
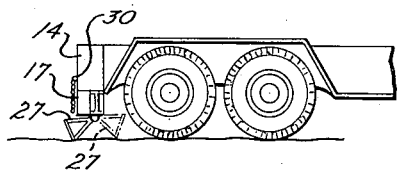
Fig. 6 is a detail view of my stabilizer in two possible positions showing the position it assumes when the vehicle moves forwardly or rearwardly with the stabilizer down.

Just to mention the possible positions of my stabilizer in normal use, when the vehicle is on practically level ground with the boom either practically vertical, or turned towards the front or rear, the base plate 26 will clear the ground by a fraction of an inch. If the vehicle is moving, and there is any fairly light weight on one side, or if the ground is not quite level, the leading edge of base 26 may touch the ground, or a projection from the ground, in which case the foot will swing in pendulum fashion forwardly (broken line, Fig. 6) or rearwardly (full line, Fig. 6) depending on whether the vehicle is backing up or moving forward. This is the situation when the vehicle is so near the location of the job that it is considered unnecessary to swing the foot upwardly and secure it. Such small amount of "dragging" as is indicated in Fig. 6 does no harm whatever, and this is especially so since the pivot pin 25 is disposed transversely to the direction of movement of the vehicle and parallel to the vehicle axles so that there cannot be any distortion or breaking of the suspension.

When in use as shown in Fig. 2 the firm support afforded by my stabilizer takes the weight entirely off the right wheels and springs, the slight amount of drop on the working side being taken up completely by compression in the tires until the stabilizer makes firm contact with the ground. Actually the stabilizer may be used in lowered position, with its outrigger arm pushed in all the way. The outrigger is pulled out only when the anticipated load seems to require it.

Figure 3:
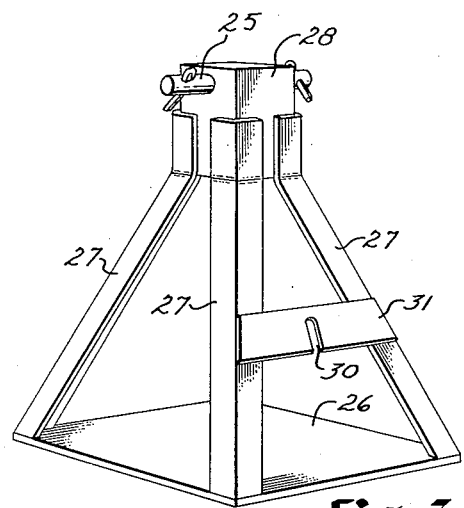
Fig. 3 is a perspective view of the stabilizer "foot" portion.
Figure 8:
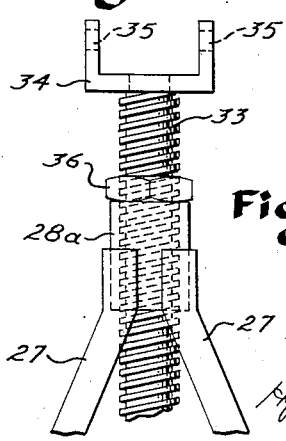
Fig. 8 is an enlarged view of a somewhat modified form of the invention in which the stabilizer foot is adjustable in height.

While the stabilizer just described is quite adequate to cope with most situations, I have added a height-adjusting feature as shown in Fig. 8 for possible use where there may be an abnormal drop in ground level at the spot where the stabilizer base is intended to rest. In this embodiment the block 28a (which corresponds generally with the block 28 in Fig. 3) is bored out and provided with a square machine thread adapted to receive a post 33 fitted with a mating thread. The top of post 33 is fixed to a yoke part 34 bored out at 35 to receive pivot pin 25. In this embodiment when the outrigger beam 18 is pulled out the foot member can be twirled on the threaded post until it contacts the ground, after which the lock nut 36 is turned down to maintain the foot in position.

The stabilizer herein described is much more simple and inexpensive than those which have previously been available. Many of the stabilizers heretofore known have been mechanically complex and have required quite an appreciable time to get set up, ready for working. They usually had to be blocked up with a semi-permanent support underneath or their adjustable features took a long time to arrange, especially when it had to be done at four separate points. All the operations had to be reversed to get the vehicle ready to move again. With my stabilizer it takes only a couple of seconds to pull out each stabilizer beam and drop the foot to working position, and when all four feet are in said working position the vehicle can move forwardly or rearwardly without returning them to idle position.

What I claim is:

1. Stabilizing means for a crane-carrying vehicle, said means including a tubular housing rigidly attached to the vehicle frame and extending transversely of the vehicle length, a pair of rigid beams slidably carried in said housing, said beams lying side by side in parallel relationship and being relatively movable, one beam movable out of one end of the housing and the other beam out of the other end of the housing so that their outer ends are extendable laterally a substantial distance outside the vehicle sides, and a fixed length stabilizer foot pivotally attached to the outer end of each beam on a respective axis which is parallel to the vehicle axle, said foot consisting of a base and upwardly and inwardly inclined members defining a pyramidal contour, said members converging towards and supporting the aforesaid pivotal axis.

2. Stabilizing means as defined in claim 1, wherein said stabilizer foot is disposed to have minute clearance from the ground when the vehicle is idle and the crane is not extended laterally under load, but said foot being readily depressed to supporting contact with the ground when the crane extends laterally under load whereby said foot relieves the vehicle springs from any undue flexure.

References Cited in the file of this patent

UNITED STATES PATENTS

| | | |
|---|---|---|
| 1,519,117 | Cochran | Dec. 16, 1924 |
| 1,765,295 | Beckman | June 17, 1930 |
| 1,869,747 | Howard | Aug. 2, 1932 |
| 1,965,367 | Brown | July 3, 1934 |
| 2,126,597 | Zeilman | Aug. 9, 1938 |
| 2,487,827 | Persson | Nov. 15, 1949 |